United States Patent
Bradburn (10) Patent No.: US 8,929,871 B2
(45) Date of Patent: Jan. 6, 2015

(54) METHODS FOR REMINDING A USER OF A TASK ASSOCIATED WITH A COMMUNICATION

(75) Inventor: Travis L. Bradburn, Ortonville, MI (US)

(73) Assignee: General Motors LLC, Detroit, MI (US)

( * ) Notice: Subject to any disclaimer, the term of this patent is extended or adjusted under 35 U.S.C. 154(b) by 296 days.

(21) Appl. No.: 12/953,064

(22) Filed: Nov. 23, 2010

(65) Prior Publication Data

US 2012/0129510 A1    May 24, 2012

(51) Int. Cl.
*H04M 3/00* (2006.01)
*H04M 3/42* (2006.01)
*G06Q 10/10* (2012.01)
*H04M 3/424* (2006.01)

(52) U.S. Cl.
CPC ......... *H04M 3/42127* (2013.01); *G06Q 10/109* (2013.01); *G06Q 10/1093* (2013.01); *H04M 3/42195* (2013.01); *H04M 3/424* (2013.01); *H04M 2203/2072* (2013.01)
USPC ..................... 455/418; 455/412.2; 455/414.2; 455/415; 455/567

(58) Field of Classification Search
USPC ................. 455/418, 415, 417, 458, 564, 567, 455/569.2, 412.2, 414.2; 379/88.22–88.27
See application file for complete search history.

(56) References Cited

U.S. PATENT DOCUMENTS

| | | | |
|---|---|---|---|
| 7,119,716 B2 | 10/2006 | Horstemeyer | |
| 7,325,032 B2 | 1/2008 | Zuberec et al. | |
| 2006/0223576 A1 | 10/2006 | Macaluso | |
| 2008/0037743 A1* | 2/2008 | Bishop | 379/201.01 |
| 2008/0247530 A1* | 10/2008 | Barton et al. | 379/216.01 |
| 2009/0094283 A1 | 4/2009 | Baudisch et al. | |
| 2010/0246785 A1* | 9/2010 | Wang et al. | 379/88.23 |
| 2010/0260327 A1* | 10/2010 | Ray | 379/93.23 |

FOREIGN PATENT DOCUMENTS

WO    WO 2007/015726    2/2007

* cited by examiner

*Primary Examiner* — Marcos Torres
(74) *Attorney, Agent, or Firm* — Dierker & Associates, P.C.

(57) ABSTRACT

Methods for reminding a user of a task associated with a communication are disclosed herein. One example of the method involves reminding the user of a task associated with an incoming communication, and another example of the method involves reminding the user of a task associated with an outgoing communication.

11 Claims, 2 Drawing Sheets

Fig-1

METHODS FOR REMINDING A USER OF A TASK ASSOCIATED WITH A COMMUNICATION

TECHNICAL FIELD

The present disclosure relates generally to methods for reminding a user of a task associated with a communication.

BACKGROUND

Mobile devices may be used to initiate a communication between two parties. Sometimes, a task may be associated with the subject matter of the communication and/or one or more of the parties of the communication. For example, one party may have one or more appointments scheduled in his/her electronic calendar to talk to another party. Using the electronic calendar, a reminder about the appointment may be set. However, if the electronic calendar is not open, the user will not be reminded of the particular appointment until the calendar is opened, at which point, the appointment may have passed.

SUMMARY

Methods for reminding a user of a task associated with a communication are disclosed herein. One example of the method involves reminding a user of a task associated with an incoming communication. This method includes receiving a notice of the incoming communication at a mobile communications device, and upon receiving the notice, automatically retrieving, from a memory associated with the mobile communications device, metadata associated with another communications device from which the communication was initiated. Prior to engaging in a conversation between the user of the mobile communications device and a user of the other communications device, the method further includes automatically presenting in visual format or audio format, to the user of the mobile communications device, the task associated with the metadata. Upon reviewing the task, the method yet further includes accepting or declining the communication.

Another example of the method involves reminding a user of a task associated with an outgoing communication. This method includes, via a mobile communications device, initiating the outgoing communication directed to another communications device, and during the initiating, automatically retrieving, from a memory associated with the mobile communications device, metadata associated with the other communications device. Prior to engaging in a conversation between the user of the mobile communications device and a user of the other communications device, the method further includes automatically presenting in visual format or audio format, to the user of the mobile communications device, the task associated with the metadata. Upon reviewing the task, the method yet further includes either continuing or ending the outgoing communication.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the methods disclosed herein may advantageously be used to remind a mobile device user of a task associated another mobile device i) from which an incoming communication is sent, and/or ii) to which an outgoing communication is directed. The reminder provides the user with enough information to remind the user of one or more tasks associated with the subject matter of the call and/or with the calling/receiving party. The reminder is also advantageously provided to the user before an actual connection is made. This allows the user to elect whether or not he/she wants to accept an incoming call and/or proceed with an outgoing call. For example, if the reminder reveals information pertaining to a task that the user is not yet ready to discuss, he/she may elect to decline an incoming communication from the calling party or discontinue an outgoing communication to the receiving party associated with the task. In another example, if the reminder reveals information pertaining to a task that the user is ready to address, the user may elect to accept a communication with the calling party or continue an outgoing communication directed to the receiving party associated with the task.

It is to be understood that, as used herein, the term "mobile device user" or "user" is a person or entity that owns or otherwise possesses a mobile device capable of receiving incoming communications and initiating outgoing communications. In some instances, the "user" may also be a vehicle owner, a vehicle driver, and/or a vehicle passenger, and the term "user" may be used interchangeably with the term subscriber/service subscriber.

Further, a "task" refers to an activity with which a calling/receiving party is associated. It is to be understood that to be associated with the activity, the calling/receiving party may or may not be required to actually participate in the activity. As one example, the activity may be a discussion about a particular topic, and the calling/receiving party may be directly involved in the discussion. As another example, the activity may be going to the grocery store, and the calling/receiving party may be associated with the activity by virtue of having asked the user to perform the activity. In many cases, the user may also be either directly or indirectly associated with the task. For example, the task may remind the user to remind the calling/receiving party that he/she is to be going to the grocery store. Information pertaining to the task may be stored in a task file that is stored in an electronic memory of the user's mobile device. This information pertaining to the task may be comprehensive, for example, and may include what the task is, the parties associated with the task, a date and/or time by which the task should be performed, and/or any other information pertaining to the task that the user wishes to include. For instance, if the task is a sales meeting with representatives from Company A, then the information stored in the task file may include i) an identification of the task (e.g., a sales meeting with representatives from Company A), ii) what the task (i.e., the sales meeting) is about (e.g., to buy a one year supply of chemical B from Company A), iii) when the task (i.e., the sales meeting) is to take place (e.g., on Oct. 1, 2010), iv) who will be attending, and/or v) the like. It is to be understood that the information stored in the task file may be less comprehensive than the example described above. For instance, the task file may simply include an identification of the activity. It is further to be understood that the user or other authorized person who creates the task file may determine, based on his/her discretion, how much information to include in the task file.

In an example, the task file may be stored in a contact included in a contact list that is resident on the user's mobile device. As used herein, a "contact list" refers to a collection of contacts created by the user or another authorized user, or transmitted to the user's mobile device from another source (e.g., a synched device, a forwarded contact, etc.). A single contact may include metadata stored in a contact file, where the metadata is associated with a communications device of the particular contact. Some examples of metadata include an identifier of the contact (such as the person's name, nickname, or the like, which may be referred to as a caller identification or a caller ID), a mobile dialing number MDN of the other mobile device (which may be referred to as a phone number), and/or the like.

It is to be understood that a single contact may have associated therewith a single task file, or may have associated therewith a plurality of task files. In instances where a contact includes a plurality of task files, the task files may be organized according to a due date, a level of importance, or via other means previously designated by the user.

Additionally, an "incoming communication" refers to a voice or data communication sent by another party's mobile device and received by the user's mobile device. For incoming communications, the user's mobile device may be referred to as the receiving device, and the other party's mobile device (i.e., the mobile device used to initiate the communication) may be referred to as the calling or sending device. Further, the other party utilizing the calling device is referred to herein as the calling or sending party.

Similarly, an "outgoing communication" refers to a voice or data communication sent by the user's mobile device and received by another party's mobile device. For outgoing communications, the user's mobile device is considered to be the calling or sending device, and the other party's mobile device (i.e., the device receiving the communication) is referred to as the receiving device. In this case, the other party utilizing the receiving device is referred to herein as the receiving party.

Yet further, a "conversation" refers to the exchange of information between parties of a communication once a connection between the parties' mobile devices has been established.

Furthermore, the term "communication" itself is to be construed to include all forms of communication, including direct and indirect communication. As such, indirect communication may include communication between two components with additional component(s) located therebetween.

Still further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Figure 1:
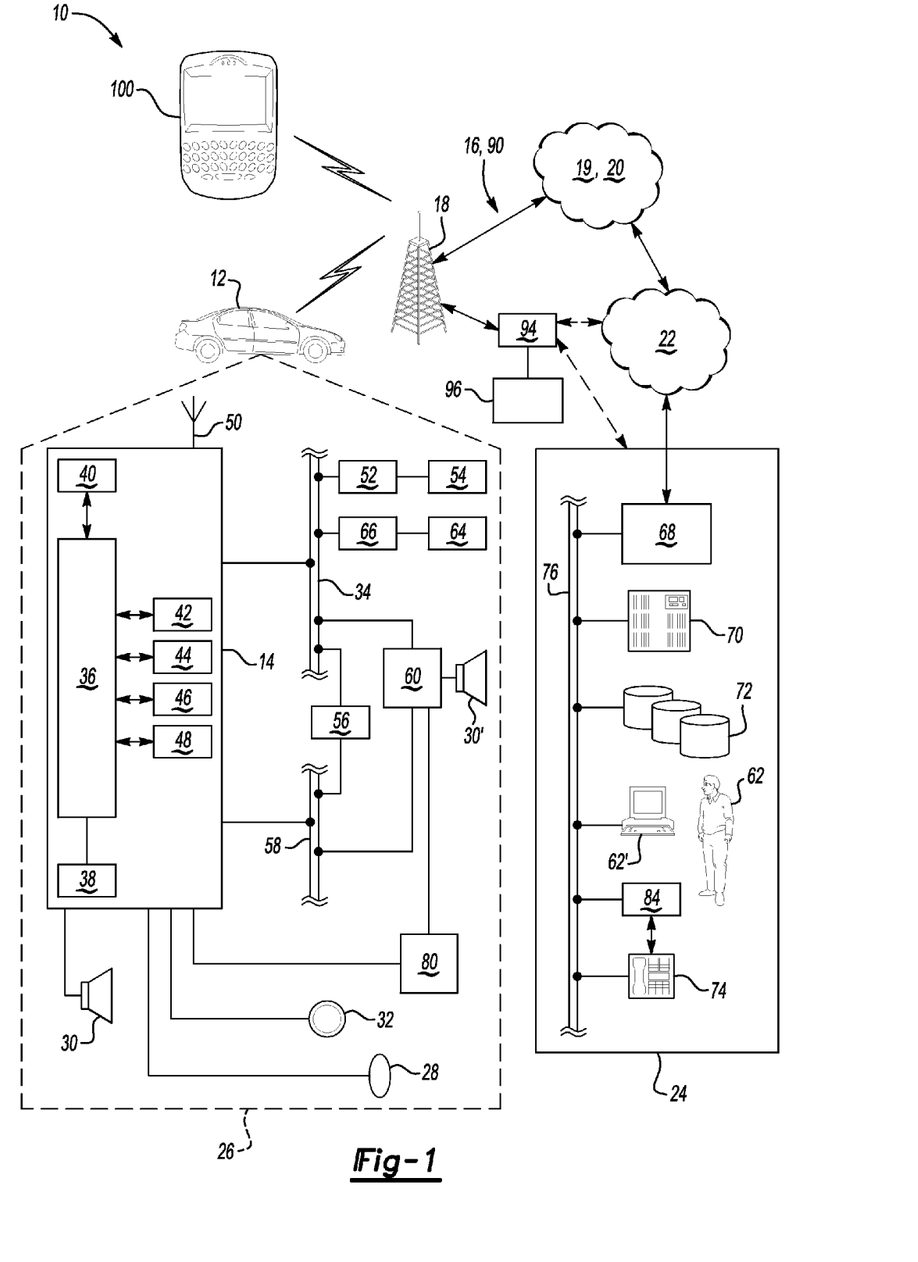
FIG. 1 is a schematic diagram depicting an example of a system for reminding a user of a task associated with an incoming or an outgoing communication.

One example of a task reminder system 10 is schematically depicted in FIG. 1. This example system 10 utilizes an in-vehicle telematics unit 14 as the user's mobile communications device, and a mobile smart phone as another party's mobile communications device 100. However, it is to be understood that the user's mobile device and/or the other party's mobile device may be chosen from any mobile communications device that is capable of running an application to perform at least some of the steps of the task reminder methods disclosed herein. These devices are also chosen from those that have an internal electronic memory within which a contact list may be stored. In addition to telematics units and smart phones, another example of such a mobile communications device includes a computer configured to run software that enables the user to send or receive voice calls and/or data calls over the Internet, such as via SKYPE® or the like.

Referring now to FIG. 1, this example of the system 10 generally includes a vehicle 12, a telematics unit 14 operatively disposed in the mobile vehicle 12, a carrier/communication system 16 (including, but not limited to, one or more cell towers 18, one or more base stations 19 and/or mobile switching centers (MSCs) 20, and one or more service providers (e.g., 90) including mobile network operator(s)), one or more land networks 22, and one or more telematics service/call centers 24.

In an example, the carrier/communication system 16 is a two-way radio frequency communication system, and may be configured with a web service supporting system-to-system communications (e.g., communications between the call center 24 and the service provider 90). The carrier/communication system 16 may also or otherwise be configured with a front-end human-machine interface (HMI, e.g., a webpage) that a user may interact with, for example, to sign up for services, request services, change a service plan, create a task, or the like. In this instance, the carrier/communication system 16 would also include a host server 94 including suitable computer equipment (not shown) upon which information of a remotely accessible page 96 (e.g., a webpage, an Internet enabled program, or the like) resides/is stored. Further details of how the remotely accessible page 96 is used will be described below.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicle 12 is a mobile vehicle, such as a motorcycle, car, truck, recreational vehicle (RV), boat, plane, etc., and is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. The telematics unit 14 is linked to both the host server 94 and the call center 24. The telematics unit 14 is capable of transmitting data to the host server 94 and is also capable of calling and transmitting data to the call center 24.

The telematics unit 14 provides a variety of services, both individually and through its communication with the call center 24. The call center 24 includes at least one facility that is owned and operated by a telematics service provider. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components (e.g., the short range wireless communication network 48). It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs having computer readable code to initiate and/or perform various functions of the telematics unit 14. In an example, the processing device 36 includes software programs configured to run an application that is resident on the telematics unit 14 to create a task, and to store the task in a contact list in the electronic memory 38. Details of how the task is created and stored are provided hereinbelow.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies, such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like. In an example, the electronic memory 38 is configured to store at least one contact in the contact list, and when a task exists, the task (along with information pertaining to the task, which is stored as a task file) is stored in the contact within the electronic memory 38.

The telematics unit 14 provides numerous services alone or in conjunction with the call center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the call center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art.

Conversely, speaker(s) 30, 30' provides verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and telematics service call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service provider call center 24 (whether it be a live advisor 62 or an automated call response system 62') to request services, to initiate a voice call to another mobile communications device (such as the device 100), etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58. In one example, the audio component 60 may be used to audibly present a task to the user upon initiating or receiving a communication to/from the other communications device 100.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the call center 24 (when transmitted thereto from the telematics unit 14) to determine the operation of the vehicle 12. Examples of sensor interface modules 66 include powertrain control, climate control, body control, and/or the like.

In an example, the vehicle hardware 26 includes a display 80, which may be operatively directly connected to or in communication with the telematics unit 14, or may be part of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In an example, the display 80 may also be used to visually present, to the user, a task associated with a caller/receiving party of the other mobile communications device 100.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof.

The call centers 24 of the telematics service provider (also referred to herein as a service center) are designed to provide the vehicle hardware 26 with a number of different system back-end functions. According to the example shown in FIG. 1, one service center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of service center 24 functions. Further, the various operations of the service center 24 are carried out by one or more computers (e.g., computer equipment 74) programmed to carry out some of the tasks of the service center 24. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

It is to be appreciated that the service center 24 may be any central or remote facility, manned or unmanned, mobile or fixed, to or from which it is desirable to exchange voice and data communications. As such, the live advisor 62 may be physically present at the service center 24 or may be located remote from the service center 24 while communicating therethrough.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider service center 24, the telematics service provider is a separate and distinct entity from the network provider 90. In an example, the equipment, employees, etc. of the communications network provider 90 are located remote from the service center 24. The communications network provider 90 provides the user with telephone and/or Internet services, while the telematics service provider provides a variety of telematics-related services (such as, for example, those discussed hereinabove). It is to be understood that the communications network provider 90 may interact with the service center 24 to provide services (such as emergency services) to the user. It is to be understood that either or both of the communications network provider 90 or/and the telematics service provider may operate the website 96 for setting up tasks.

While not shown in FIG. 1, it is to be understood that in some instances, the telematics service provider operates a data center, which receives voice or data calls, analyzes the request associated with the voice or data call, and transfers the call to an application specific call center associated with the telematics service provider. It is to be understood that the application specific call center may include all of the components of the data center, but is a dedicated facility for addressing specific requests, needs, etc. Examples of application specific call centers include, but are not limited to, emergency services call centers, navigation route call centers, in-vehicle function call centers, or the like.

Figure 2:
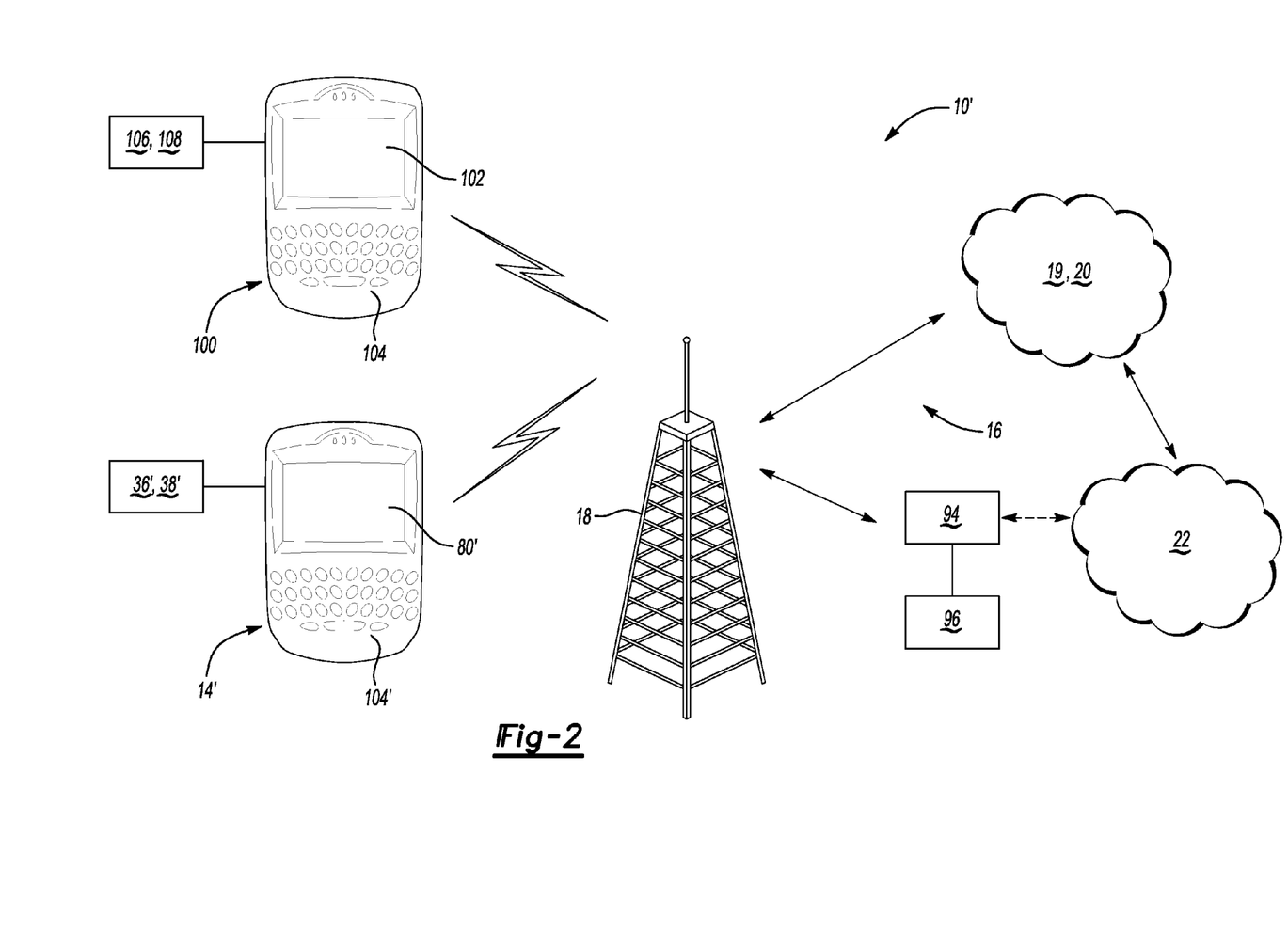
FIG. 2 is a schematic diagram depicting another example of a system for reminding a user of a task associated with an incoming or an outgoing communication.

Another example of a task reminder system 10' is shown in FIG. 2. In this example, both the user's mobile device 14' and the other party's mobile device 100 are smart phones. Each phone 14', 100 includes an electronic memory 38', 106, respectively, which is associated with an internal processor 36', 108. In an example, at least the processor 36' of the user's mobile device 14' may be configured to run software programs for performing various steps of the examples of the method disclosed herein, while the electronic memory 38' may be configured to store a contact list that includes one or more contacts that have a task associated therewith. It is to be understood that the other party's mobile device 100 may also have the software and/or hardware to perform various steps of the examples of the method disclosed herein.

Each of the phones 100, 14' also includes a display 102, 80' (examples of which are provided in the description of FIG. 1) upon which various information may be presented to the user (such as, e.g., information pertaining to a task), and a keypad or touchpad 104, 104'. The keypad or touchpad 104, 104' may be used for a variety of purposes, such as to dial a phone number, create a text message, perform various functions of the phone (e.g., to create a contact for the contact list), etc. The keypad or touchpad 104, 104' may also be used, in some instances, as a way of accepting or declining an incoming communication, or as a way of continuing or ending an outgoing communication. Furthermore, the display 102, 80' may be a touchscreen, which functions as both the display 102, 80' and the touchpad 104, 104'.

Further, the mobile devices 100, 14' may attempt and possibly establish a communication with each other via the carrier/communication system 16 previously described above in conjunction with FIG. 1.

Examples of methods for reminding a user of a task associated with a communication will now be described herein. One of these examples involves a method of reminding the user of a task associated with an incoming communication, while another of these examples involves a method of reminding the user of a task associated with an outgoing communication.

The example of the method of reminding a user of a task associated with an incoming communication includes creating a task. One way of creating a task may be accomplished using the remotely accessible page 96. The remotely accessible page 96 is a website (including one or more webpages) that is set up and maintained by the communications network provider 90 or by the telematics service provider. The user may access the website 96 by, e.g., accessing a login screen using a computer system or other device capable of accessing the Internet, and then submitting an appropriate login and password (or other secure access information) into the designated spots on the login screen. In an example, the remotely accessible page 96 enables the user or another authorized person to access a user account for i) creating and/or revising a contact for a contact list, and/or ii) creating and/or revising a task and then linking the task with a contact present in the contact list. The user may, e.g., sign up to utilize the remotely accessible page 96 to access/manage his/her contact list and/or the tasks associated with one or more contacts included in the contact list. Upon registering, the user is given an initial password and login ID, both of which may be customized by the user after the initial registration process is complete. An account is set up for the user, which may include a name and/or company name associated with the account, contact information, billing information, etc. The subscriber (or user) can enroll via one of several methods. As one example, the subscriber can enroll through the home page of the website 96, which may or may not be part of a more comprehensive website associated with the telematics service provider or the communications service provider 90. Another example involves placing a voice call to the call center 24 or a customer service center of the communications service provider 90, and speaking with an advisor 62 or other representative. The advisor 62 or other representative may enroll the user through computer access to the subscriber's account information.

In an example, the login screen of the remotely accessible page 96 may be part of a homepage (not shown) including enrollment boxes, and login and ID boxes that enable the user (or the advisor 62, representative, etc.) to access his/her account. The homepage may also include convenient drop-down options for the user for easy access to the user's contact list. The page 96 may be available 24 hours per day and 7 days per week (barring and scheduled and/or unscheduled maintenance of the page 96), which allows the user flexibility with updating his/her contact list.

The contact list (which may be stored on the server 94 (e.g., in the cloud), stored locally within the device (e.g., 14, 14'), or both) may be updated, for example, by accessing the user's account by submitting an acceptable login and password on the login screen of the website 96. Upon accessing the user's account, the user may update the contact list, e.g., by removing currently-existing contacts from the contact list, adding new contacts to the contact list, changing and/or updating information of a current contact in the list, and/or creating and linking a task to one or more of the contacts present in the contact list.

In an example, the user may remove a contact from the contact list by selecting the appropriate contact, and deleting the contact. Deleting may be accomplished, e.g., by selecting a delete function from a menu, pressing a delete key on a keyboard, or via any function provided within the website 96. When the contact is removed, all of the metadata associated with the contact is also removed, including the contact's name and mobile dialing number. It is to be understood that if a task is associated with a contact, upon deleting the contact, the task will be deleted as well.

When a new contact is made, the user will select to create the new contact via, e.g., a mouse click on an appropriate icon or menu choice, and will then input (as a data upload) all of the metadata for the new contact (e.g., the new contact's name, mobile dialing number, etc.). If, for example, the user wishes to make a new contact, upon selecting the appropriate icon, the user is directed to a new screen designed to create new contacts. The user may then input the metadata associated with the new contact, and may thereafter select a "SUBMIT", "DONE", "SAVE AND CLOSE", or other similar button, icon, or menu choice when the user is finished creating the new contact. A user may also select a photo, e.g., from his/her smart phone, to be associated with the contact.

A task associated with a contact may be created in the same manner as described for creating a new contact. For instance, when a particular contact is open, a task associated with that contact may be created by selecting (via, e.g., a mouse click) an appropriate icon or menu choice on the page 96, and then inputting (as a data upload) at least some information pertaining to the task. The information may be stored in the user's account in a task file, and this information may include, for example, information identifying what the task is (also referred to as a task identifier), some specific details regarding the task itself, and/or the like. In an example, if the task involves going to the grocery store, the information pertaining to the task (which is included in the task file) may include "Go to the Grocery Store" as a task identifier and "Buy bread, milk, and cheese" as some specific details of the task. In another example, if the task involves a business meeting with ABC Company, the information pertaining to the task (which is included in the task file) may include "Meeting with ABC Company" as a task identifier and "Negotiate a price for chemicals 1, 2 and 3" as some specific details of the task. In yet another example, if the task involves a reminder regarding Grandma's birthday, the information pertaining to the task may include "Grandma's Birthday on December 1" as a task identifier. In this example, upon receiving a phone call from Grandma, the user may answer the call with "Happy Birthday". As will be described in further detail below, the task information included in the task file may be presented to the user upon receiving a notice of an incoming communication from a mobile device identified by the contact having the task associated therewith (such as the mobile device 100).

The task may be linked with a particular contact before the task is created or after the task is created. In the former instance, the particular contact is opened, and then the task is created and stored (e.g., by following on-screen prompts). In the latter instance, the task may be created and stored, and then the task may be linked with a particular contact (i.e., the task may be linked with the metadata associated with the particular contact). Linking may be accomplished, for example, by selecting (via, e.g., a mouse click) an icon or other designator of the newly created task, and then selecting an icon or other designator of the particular contact. In one example, associating may be accomplished by dragging and dropping the task icon on top of the contact via the mouse, by selecting a link command from a menu option and then designating (e.g., by selected from a drop down menu, by typing in the contact name, or the like) which contact the task is to be associated with. Once the task has been linked, the user may save the updated contact list (which includes the newly created task associated with the appropriate contact) on the server 94 using a save command on the website 96. In one example, the server 94 pushes the updated contact list to the mobile device 14, 14'. In another example, the updated contact list may be pulled from the server 94 during a device-syncing process. During this syncing process, the device 14, 14' may contact the server 94 periodically (e.g., every hour, every 10 hours, every week, etc.) or at preset times, and when a connection is made, the data stored at the server 94 syncs with the device 14, 14'.

As will be described further below, upon receiving a notice of an incoming communication from a device identified by the contact having a task associated therewith, the information pertaining to the task (as stored in the task file) may be automatically presented to the user. This information is presented to the user as soon as the user's device (in this case, the telematics unit 14) is notified that the other device 100 is attempting to establish a connection with the user's device 14 (e.g., device 100 has dialed the MDN of the device 14, but the user has not yet answered the call). It may be desirable, in some instances, to put a time frame or limit or expiration date on when the task may be presented to the user. For instance, if the task is a reminder of Grandma's birthday on December 1, the time frame for the task may be designated as November 28 through December 2. Thus, the task reminder may be presented to the user any time Grandma calls from November 28 through December 2, but the task reminder is not presented prior to November 28 or after December 2. The time limit may be established by the user (using, e.g., the website 96) by designating a date and time for an expiration of the task. In another example, the user may designate that the task may expire after the first, second, third, or other user-set number of calls received from the mobile device 100 of the contact with which the task is associated. Setting the expiration of the task (such as by the date and time) may be accomplished by selecting an appropriate icon, menu choice, or the like on the website 96, and then inputting or otherwise selecting a desired expiration date and time.

The user may also set preferences pertaining to the automatic presentation of a task to the user via the website 96, such as to automatically present a task for any contact attempting to connect with the device 14, 14'. The user may also select, as a preference, to automatically present a task for one or more particular contacts (that are selected or chosen by the user) that attempt to connect with the mobile device 14, 14'.

Furthermore, in some cases, a single contact may have associated therewith a plurality of tasks. Upon creating or updating the contact list, the user may set a preference for which task(s) is/are to be presented to the user and/or the order that the tasks are to be automatically presented to the user. This may be accomplished, for example, by flagging the tasks included in a single contact as, according the user, being more important than other tasks, and selecting to present only the flagged tasks upon receiving an incoming call. In another example, the user may rank the plurality of tasks in a single contact as desired by the user. For example, the tasks may be ranked in the order of more important to least important, in the order of one task requiring more work than another task, or the like. When a user flags the tasks in a particular order, upon receiving an incoming call from a mobile device 100 associated with the tasks, the tasks are presented to the user in the designated order.

The user may also elect, as a preference, certain contacts from which the device 14, 14' may draw a task from and present to the user upon receiving a notice of an incoming communication. It is to be understood that, in this example, any tasks associated with the non-elected contacts are not automatically displayed to the user. With respect to these non-elected contacts, the device 14, 14' may ask the user whether or not he/she would like to view a task (if one is present) for the contact associated with the incoming communication. If the user wants to review the task, he/she may indicate as such via a button press, a verbal indication, or other suitable function available on the mobile device 14, 14', and the task may then be presented to the user.

The user may also elect, as a preference, to automatically present a task for a particular contact each time a call comes in, or on certain days and/or at certain times of the day when the call comes in. For instance, the user may elect to have a task automatically presented for Contact A if the contact calls on Sundays. In another instance, the user may elect to have a task automatically presented for Contact B if the contact calls between 7:00 am and 12:00 pm any day of the week.

Once the contact list has been created, and/or a task has been created and linked to a particular contact, the contact list may be downloaded onto the mobile device 14, 14' from the server 94. Downloading may be accomplished, for example, using a wireless packet data connection, similar to how an application may be updated on a cellular phone. Downloading may also be accomplished, for example, using a wired connection, similar to how a contact list may be synced between a mobile device and a desktop computer. In each example, the downloading involves a file comparison of the contact list, and updates the file on the mobile device 14, 14' to match that which is stored on the server 94.

In another example, the task may be created via an application that is resident on the mobile communications device 14, 14'. This application is a software program that is executable by the processor 36, 36', and may be used to create a task and to link the task with a particular contact in a contact list that is resident on the device 14, 14'. In an example, the application provides a user interface (e.g., displayed on the mobile device 14, 14' display 80, 80') that enables the user to create the task or a task list, and to associate the task or each task in the task list with one or more particular contacts. An example of the user interface is shown below in Table 1. In this example, the user interface includes at least a Task ID which is assigned by the application, based, at least in part, on a chronological order in which the task was created relative to other task(s). The user interface further includes a Task Description that corresponds with a particular Task ID and a Contact ID associated with the Task ID. The Contact ID is assigned by the user for each particular task (which is identified by the Task ID and described by the Task Description). The Contact ID may be a phone number associated with the contact, a name or nickname associated with the contact, or another identifier of the contact. Via various executable commands, the application walks the user through various steps of the method of creating the task and associating the task with the particular contact(s) using the use interface described herein.

In another example, the user interface further includes a function that allows the user to designate whether or not a particular task has been completed. For example, the user interface may include a column labeled "Complete", where the user may indicate that a task has been complete by inserting "yes" or "true" or a "+" sign, or may indicate that the task has not yet been completed by inserting "no" or "false" or a "−" sign. In this example, the application stored on the device 14, 14' also walks the user through various steps for marking (e.g., using a suitable designation, including positive or negative words, such as "true" and "false", or positive or negative symbols, such as check mark to designate complete, and an empty box to designate incomplete, and/or the like) a previously created task as being complete or incomplete.

TABLE 1

Example of User Interface

| Task ID | Task Description | Contact ID | Complete |
|---------|------------------|------------|----------|
| 1001 | Pick up milk, bread, and eggs from grocery store | 313-555-5000 | Yes |
| 1002 | Ask about Thanksgiving plans | Mom | No |
| 1003 | Pick up kids from soccer practice | 248-555-5678 | No |
| 1004 | Buy birthday card for Grandma | 810-555-1111 | Yes |
| 1005 | Sales meeting with ABC Company | 586-555-2222 | No |

After a task has been completed and the user updates the task list via the user interface, the application may prompt the user to delete the task or to set the task as recurring (e.g., annually).

Once the contact list has been stored on the mobile device 14, 14', the processor 36, 36' automatically scans the contact list for metadata associated with each incoming communication. For instance, the processor 36, 36' (via suitable software programs and/or routines) attempts to recognize the metadata associated with the device 100 of the calling party, such as by comparing the incoming caller information (e.g., the phone number of the caller as recognized by the device 14, 14') with the metadata stored in the contact list in the electronic memory 38, 38'. If the device 14, 14' does not recognize the caller, then no information is presented to the user. Even without the information, the user has the discretion of whether or not he/she wants to answer the call (i.e., to establish a connection with the other device 100).

In instances where the processor 36, 36' recognizes the calling device 100 (e.g., the caller information is found in the contact list upon scanning), the metadata associated with the calling device 100 may, e.g., be visually presented to the user on the display 80, 80' and/or audibly presented to the user, such as through the speakers 30, 30' of the system 10 shown in FIG. 1, for example.

If the device 14, 14' recognizes the metadata of the other device 100, the processor 36, 36' will review the contact file in the contact list for any tasks that may be associated therewith, and thus may be associated with the incoming communication. In instances where a task file is present, the processor 36, 36' automatically retrieves the information included in the task file, and presents the information to the user. It is to be understood that how the information is presented to the user depends, at least in part, on the type of mobile device 14, 14' that the user is using. For example, if the mobile device 14, 14' has a display screen associated therewith (such as the display 80, 80'), then the information of the task may be visually presented to the user on the display 80, 80'. If, in another example, the mobile device 14, 14' has an audio component (such as the audio component 60 that is associated with the telematics unit 14), the task information may be audibly presented to the user, such as through the speakers 30, 30'. In the latter example, the mobile device 14 may include a text-to-speech engine (not shown in either of FIG. 1 or 2), which may be run by the processor 36 that converts the text of the task information into a human-understandable, audible form. In still another example, the task may be presented both visually and audibly.

It is to be understood that the scanning of the contact list and the presenting of the metadata and tasks (if any are present) occurs when the user receives a notice of an incoming communication. As used herein, the term "notice" refers to some means for apprising the user that a calling party is attempting to establish a voice or data connection with the user's mobile device 14, 14'. The notice may, for example, take the form of an audible notification (such as a ring tone, etc.), a visual notification (such as a flashing light, a lighting up of a back light of the display 80, 80', etc.), and/or a tactile or physical notification (such as a vibration, etc.).

The information included in the task file may be used as a reminder to the user of a particular task associated with the owner or possessor of the calling device 100 and/or the subject matter of the call, where such reminder is provided upon receiving the notice of the incoming communication. After reviewing the content of the task information presented to the user, and prior to establishing a connection and thus engaging in a conversation with the calling party, the user may decide whether or not he/she wants to actually establish a connection with the calling device 100. In instances where the incoming communication is a voice call, upon reviewing the task information presented to the user (if any), the user may elect to i) accept the call, or ii) decline the call. For example, if the calling party is associated with a task involving a reminder for the user to pick up the dry cleaning on Tuesday, the user may elect to decline the call upon reviewing the task that he/she is supposed to pick up the dry cleaning. If, on the other hand, the calling party is associated with a task regarding a business meeting with the user, the user may elect to accept the call upon reviewing the task information containing the various issues that are supposed to be discussed during the meeting.

In instances where the communication is a voice call, the user of the device 14, 14' may elect to have the caller placed on hold while the user reviews the information pertaining to the task. For this instance, the user answers the call via any suitable command (such as by pressing a connect button on the device 14, 14', etc.) or the device 14, 14' is programmed to answer the call. In either instance, a connection is temporarily established, but the caller is automatically placed on hold while the task information is presented to the user and the user reviews the information. During the hold state, the caller may be notified of the same via a pre-recorded message (e.g., a message from the user) or by a system recorded message, which will be described further below. It is to be understood that when the caller is placed on hold, the connection between the devices 14, 14' and 100, is open, but the device 14, 14' may be automatically muted while the user reviews the task.

The caller may be transferred to the hold state for an amount of time sufficient for the user to review the task information and to make a decision as to whether or not to continue the connection established with the calling device 100, and thus accept the call. In instances where the user decides to accept the call, the user may, e.g., physically indicate as such by pressing a connect button on the mobile device 14, 14'. Another way to accept the call would be to verbally recite a recognizable command (e.g., "Accept", "Continue", or the like) into the device 14, 14' (such as into the microphone 28 of the telematics unit 14). At this point, the user may engage in a conversation with the calling party. If the user elected to decline the call, the user may indicate as such by pressing a disconnect button on the mobile device 14, 14', or to verbally recite another recognizable command (e.g., "Decline", "Disconnect", or the like) into the device 14, 14'.

In one example, the caller may then be automatically transferred to the user's voice mailing system. When, e.g., the caller is transferred to the voice mailing system, the caller may leave a voice message for the user of the device 14, 14' pertaining to the purpose for which the caller originally placed the call.

In another example, the caller is placed on hold for a prescribed amount of time that may be previously designated by the user (e.g., 15 seconds, 30 seconds, etc.). This prescribed amount of time may be designated, by the user, via the website 96 or via the application resident on the device 14, 14'. The user may elect to accept or decline the call before the end of the prescribed amount of time via one of the methods identified above. In instances where the user has not made a decision by the end of the prescribed amount of time, the mobile device 14, 14' may automatically send the caller to the voice mailing system as a default setting. It is to be understood that the user may change the default setting as desired, such as to automatically accept the call after the prescribed amount of time lapses, to place the caller on hold for another interval of time, etc.

When the caller is placed on hold, the caller may choose to stay on the line or to hang up. If the caller stays on the line, then the caller waits until he/she i) may engage in a conversation with the user of the mobile device 14, 14' (e.g., when the user indicates that he/she wants to accept the call), ii) is transferred to the user's voice mailing system (e.g., when the user indicates that he/she wants to decline the call), or iii) disconnected (e.g., also when the user indicates that he/she wants to decline the call). The user may designate, as a preference, (e.g., via the website 96) whether or not to transfer a particular caller (identified by the metadata in the associated contact) to voice mail or to just disconnect the call if the user does not want to accept it.

In an example, the user may prepare a hold message for the caller when the caller is placed on hold. This hold message may be created, e.g., using the website 96, whereby the user may type in a particular message, and such message may be played to the caller (e.g., as an automated message) during the hold time. The hold message may otherwise be created by recording a voice message using, e.g., a recording device (not shown) that is associated with the user's mobile device 14, 14'. The hold message may be a pre-recorded message by the user of the mobile device 14, 14', such as, e.g., "Hi, please give me a few minutes to prepare for our phone call. Thanks!" The hold message may otherwise be a system recorded message, such as, e.g., "Please hold while we connect you with your party."

In another example, the user may elect to have music playing while the caller is placed on hold. The music may be chosen by the user upon creating the task, such as by uploading a particular musical score onto the website 96, linking the mobile device 14, 14' with a particular radio station that will play what is currently being broadcast during the holding time, and/or the like.

In another example, the user may designate (using, e.g., the website 96 or the application resident on the device 14, 14') to bypass the voice mailing system upon receiving a call from a mobile device 100 with which a task is associated. In this case, the mobile device 14, 14' continues to ring until the user accepts or declines the call.

In instances where the user elects to accept the call, after indicating as such, a voice connection is established between the user's device 14, 14' and the caller's device 100. During this connection, a conversation between the parties may take place.

In another example, the incoming communication may be a data communication such as, e.g., a text message. In this example, upon receiving a notice of an incoming text message (e.g., an icon that represents a text message (e.g., an envelope or the like) may be displayed on the display 80, 80' upon receiving the message from the other device 100,), the processor 36, 36' scans the contact list for metadata associated with the incoming text message, and if available, for a task file associated with the contact. If a task file is present, the information included in the task file is automatically presented to the user of the mobile device 14, 14' (e.g., on the display 80, 80', through the speakers 30, 30', etc.). Upon reviewing the task information, the user of the device 14, 14' may elect to read or not read the text message. It is to be understood that, in this example, the text message remains on the device 14, 14' regardless of whether or not the user wants to review it. The task information may be used in this example to simply allow the user to decide whether or not he/she wants to review the text message at the time that the message is actually received. In another example, the text message may be received, and then an associated task would be presented to the user.

An example of a method of reminding a user of a task associated with an outgoing communication will now be described herein. This method also involves creating a task associated with a particular contact in a contact list, as described above. To briefly reiterate from above, the task may be created by identifying the task (using, e.g., the website 96 or the application resident on the device 14, 14') and then linking the task with a contact (e.g., the metadata associated with the other device 100), or by identifying the particular contact and then creating the task for the contact.

This example method further involves, via the user's mobile device 14, 14', initiating an outgoing communication that is directed to another mobile device (such as the mobile device 100). In instances where the outgoing communication is a voice call, the call may be initiated by dialing a phone number of the other device 100. Once the phone number has been dialed, but before a connection between the device 14, 14' and the other device 100 is attempted, the metadata associated with the phone number is automatically retrieved from the contact list (if a contact associated with the phone number is present in the user's contact list). In instances where a contact exists and a task is associated with the contact, the information included in the task file is automatically presented to the user via one or more of the methods described above.

In another example, the outgoing communication may be initiated by retrieving or articulating a phone number of the other communications device 100 (e.g., from a phone directory or other source), and then storing the phone number without dialing the phone number, while the user reviews any task(s) associated with the articulated phone number. In this example, the processor 36, 36' identifies the mobile device 100 and scans for any task(s) that the user has set for the contact associated with the mobile device. If task(s) are available, it/they are presented to the user. During this time, the phone number has not been dialed, but rather has been stored in a temporary dialing cache of the electronic memory 38, 38'. After reviewing the task(s), the user may thereafter choose to continue the outgoing communication by requesting that the temporarily stored number be dialed, or to end the communication by deleting the phone number. In one example, a mobile device 14, 14' that has the task program downloaded thereto, the task program will take the place of the normal dialing function. As such, when a number is typed in or a contact is selected, the first command (e.g., hitting the phone button or dial button) is a search command that tells the processor 36, 36' to search the metadata. When the user inputs the second, continue, command (e.g., hitting the phone button or dial button a second time) the mobile device 14, 14' actually dials the number that had previously been input or selected. The number is stored because it is the same number that is being used to search the metadata for associated tasks.

Upon reviewing the task information, and prior to engaging in a conversation with the receiving party (i.e., the owner or possessor of the other mobile device 100,), the user may elect to continue or end the outgoing communication. In instances where the user elects to continue the outgoing communication, if a voice call is initiated, a connection with the other mobile device 100 is attempted by the user's device 14, 14'. In an example, the connection is established if the receiving party in possession of the other device 100 answers the outgoing call, and a conversation may then take place between the parties. In another example, the connection is not established, and thus the voice call ends, if the user's device 14, 14' hangs up prior to the receiving party answering the voice call.

In another example, the outgoing communication may be a data communication such as a text message. In this example, the user may initiate a text message function on the mobile device 14, 14', such as by selecting a particular contact in the contact list and then indicating on the device 14, 14' to create a text message. Prior to actually creating the text message (such as by typing the message (using, e.g., the keypad 104') or reciting the message (using, e.g., the microphone 28) into the device 14, 14'), the task associated with the contact (if a task is present) is automatically presented to the user. Upon reviewing the task, the user may elect to continue with the outgoing communication by creating and then sending the text message to the other device 100, or may elect to end the outgoing communication. In the later instance, the user does not create a message, and selects an end function to quit the instant text messaging operation.

While several examples have been described in detail, it will be apparent to those skilled in the art that the disclosed examples may be modified. Therefore, the foregoing description is to be considered non-limiting.

The invention claimed is:

1. A method for reminding a user of a task associated with an incoming communication, comprising:
   creating the task by identifying the task and then linking the task with metadata for an other communications device;
   upon creating the task, selecting a time frame for when the task is to be presented to the user, the time frame including a start date and an end date;
   receiving a notice of the incoming communication at a mobile communications device, wherein the incoming communication is a voice call;
   upon receiving the notice and while the incoming communication is in progress:
      automatically retrieving, from a memory associated with the mobile communications device, the metadata for the other communications device from which the incoming communication was initiated, wherein the metadata includes caller identification, a name of a caller in possession of the other communications device from which the incoming communication was sent, or combinations thereof;
      scanning a contact list stored in the memory for the metadata;
      upon recognizing that the metadata is present in the contact list, reviewing the contact list for a task file storing information pertaining to the task, wherein the task is an activity with which the other user is associated;

comparing a date of the incoming communication with the time frame for when the task is to be presented to the user;

based on the comparing, determining that the date of the incoming communication is within the start date and the end date; and upon recognizing that the task file is in the contact list and determining that the date of the incoming communication is within the start date and the end date, and prior to engaging in a conversation between the user of the mobile communications device and an other user of the other communications device, automatically presenting in a visual format or an audio format, to the user of the mobile communications device, the information pertaining to the task;

after the information pertaining to the task is automatically presented to the user:

placing the caller on hold while reviewing the information pertaining to the task; and playing a message pre-recorded by the user for the caller; and upon reviewing the information pertaining to the task, either accepting or declining the incoming communication.

2. The method as defined in claim 1 wherein the creating of the task is accomplished via a remotely accessible page or an application resident on the mobile communications device.

3. The method as defined in claim 2 wherein the task is a birthday of the caller in possession of the other communications device, and wherein the start date of the time frame is at least one day before the birthday and the end date is at least one date after the birthday.

4. The method as defined in claim 1 wherein i) accepting the incoming communication includes establishing a voice connection with the other communications device, and ii) declining the incoming communication includes sending the voice call to a voice mailing system.

5. The method as defined in claim 1 wherein any of:

the task involves going to a store, and the information pertaining to the task includes specific details of what to purchase;

the task involves a meeting, and the information pertaining to the task includes specific details about the meeting; or the task involves a reminder about a contact's birthday, and the information pertaining to the task includes a name of the contact and a birthdate of the contact.

6. The method as defined in claim 1 wherein the creating of the task further comprises preparing a hold message to be played while reviewing the information pertaining to the task by recording a voice message using a recording device of the mobile communications device.

7. A task reminder system, comprising:

a remotely accessible page or an application resident on a mobile communications device for creating a task by identifying the task, linking the task with metadata for an other communications device, and selecting a time frame for when the task is to be presented to the user, the time frame including a start date and an end date;

the mobile communications device configured to i) receive an incoming communication from the other communications device, wherein the incoming communication is an incoming voice call, and ii) initiate an outgoing communication to the other communications device, the mobile communications device including:

an electronic memory operatively disposed in the mobile communications device, the electronic memory being configured to store at least one contact in a contact list, wherein the at least one contact includes i) the metadata for the other communications device, wherein the metadata includes caller identification, a name of a caller when the other communications device initiates the incoming communication, a name of a receiving party when the other communications device receives the outgoing communication, or combinations thereof, ii) the task linked with the metadata, wherein the task is an activity with which the other user is associated, and iii) information pertaining to the task;

a processor for retrieving the metadata; scanning the contact list for the retrieved metadata; reviewing the contact list for a task file storing the information pertaining to the task upon recognizing that the metadata is present in the contact list; retrieving the information pertaining to the task; comparing a date of the incoming communication with the time frame for when the task is to be presented to the user; and based on the comparing, determining whether the date of the incoming communication is within the start date and the end date, the processor to initiate the steps upon the receipt of the incoming communication and perform the steps while the incoming communication is in progress;

means for automatically presenting, to a user of the mobile communications device, the information pertaining to the task linked with the metadata while the incoming communication is being received and prior to engaging in a conversation between a user of the mobile communications device and an other user of the other communications device;

means for placing the caller of the incoming voice call on hold while reviewing the task;

means for playing a message that is pre-recorded by the user, while the caller is on hold; and means for allowing the user to accept or decline the incoming communication; and the other communications device configured to initiate the incoming communication directed to the mobile communications device.

8. The system as defined in claim 7, further comprising:

means for downloading the task from the remotely accessible page into the contact list stored on the mobile communications device.

9. The system as defined in claim 7 wherein the contact list includes a plurality of contacts, each including a respective task, and wherein the mobile communications device further includes means for setting at least one preference pertaining to the automatic presentation of the respective task to the user, the at least one preference including automatically presenting the respective task for one or more selected contacts attempting to connect with the mobile communications device, and not automatically presenting the respective task for one or more other selected contacts attempting to connect with the mobile communications device.

10. The system as defined in claim 7 wherein the contact includes a plurality of tasks, and wherein the mobile communications device further includes means for setting a preference pertaining to the automatic presentation of a flagged task from the plurality of tasks to the user.

11. The system as defined in claim 7 wherein the mobile communications device is a telematics unit, a smart phone, a computer including software enabling the user to initiate or receive voice calls over the Internet, or combinations thereof.

* * * * *